United States Patent

Harrison, III et al.

[15] 3,662,374
[45] May 9, 1972

[54] AUTOMATIC GENERATION OF A MOUTH DISPLAY AND ANIMATION OF THE MOUTH IN RESPONSE TO SOUND

[72] Inventors: Lee Harrison, III, Camarillo, Calif.; Francis J. Honey; Edwin J. Tajchman, both of Denver, Colo.; Lloyd W. Bowles, Lakewood, Colo.

[73] Assignee: Computer Image Corporation, Denver, Colo.

[22] Filed: July 13, 1970

[21] Appl. No.: 54,305

[52] U.S. Cl. .......................340/324 A, 179/1 AS, 179/1 VS, 352/5, 352/15, 352/16
[51] Int. Cl. .............................................G06f 3/14
[58] Field of Search..................340/324 A; 352/5, 8, 15, 16; 315/18, 26; 84/464; 179/1 AS, 1 VS

[56] References Cited

UNITED STATES PATENTS

| | | | |
|---|---|---|---|
| 3,140,347 | 7/1964 | Cohen | 84/464 |
| 3,440,349 | 4/1969 | Gibbs | 179/1 VS |
| 3,360,724 | 12/1967 | Guros et al. | 179/1 AS |
| 3,546,584 | 12/1970 | Scarr | 179/1 AS |
| 3,038,061 | 6/1962 | O'Reilly | 84/464 |
| 2,804,500 | 8/1957 | Giacoletto | 179/1 VS |

*Primary Examiner*—John W. Caldwell
*Assistant Examiner*—Marshall M. Curtis
*Attorney*—Rogers, Ezell, Eilers & Robbins

[57] ABSTRACT

Automatic synchronization of movement of a computer generated mouth to movement of a real mouth uttering words. Establishing signals to define the basic form of the mouth generated by the computer for display on a display tube. Combining high frequency sine and cosine signals with the basic form signals to form the body of the mouth on the display tube with modulation of the high frequency signals for shaping the lips. Utilizing pattern recognition and filtering signals of different frequencies that correspond to different spoken sounds. Combining the filtered signals to create control voltages representative of the realistic or alternatively, intentionally impressionistic motions of the mouth corresponding to the spoken sound. Using the control voltages to control movement of the beam of the display tube to effect the amplitude of movement of the upper lip, the amplitude of movement of the lower lip, and the width of the mouth generated by the computer. Controlling the intensity of the beam as the mouth is drawn and animated.

17 Claims, 9 Drawing Figures

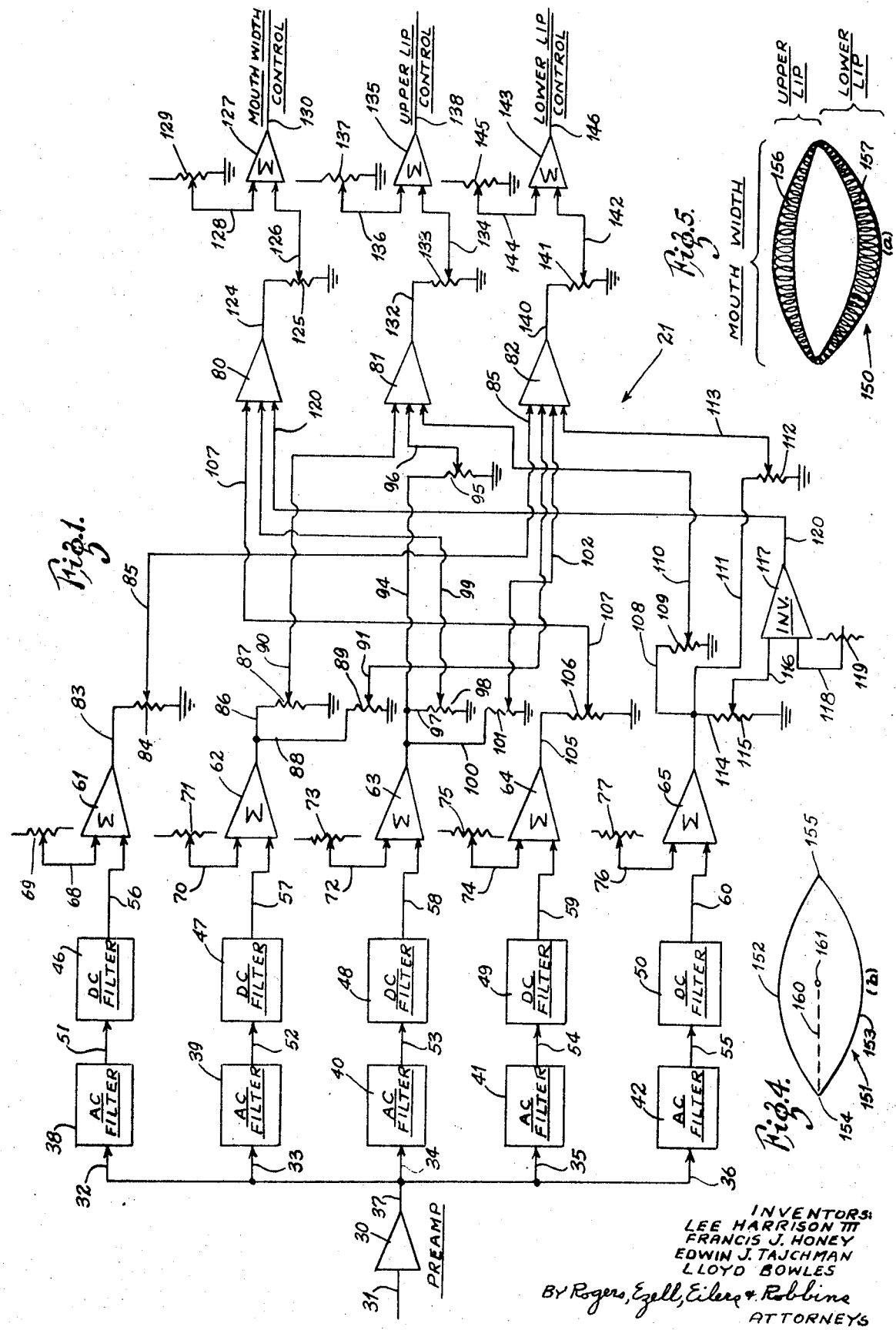

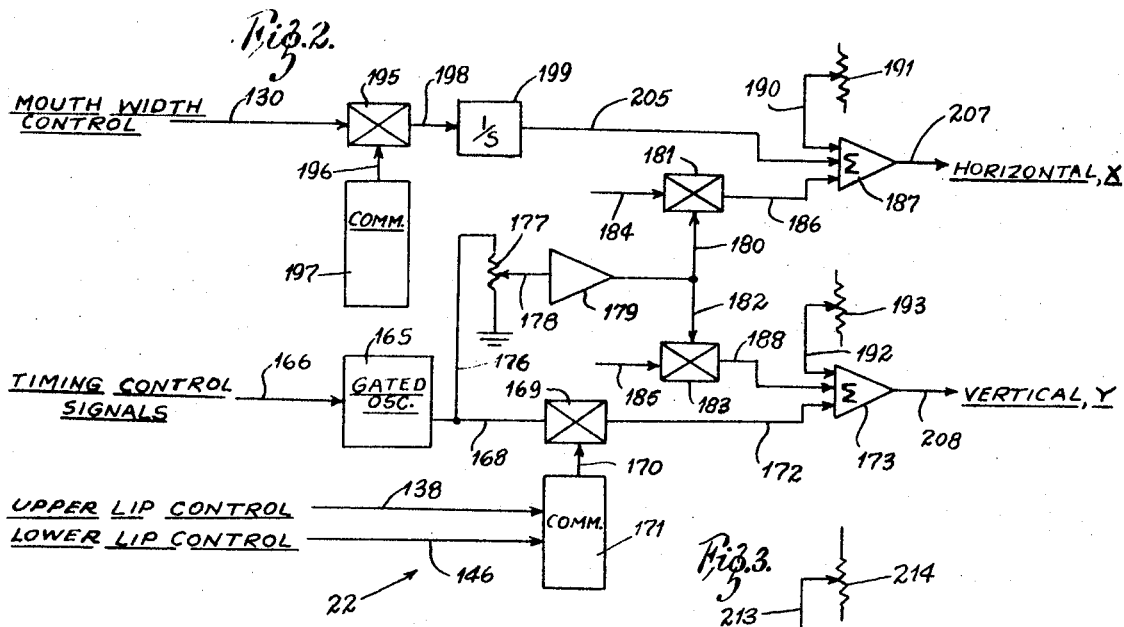
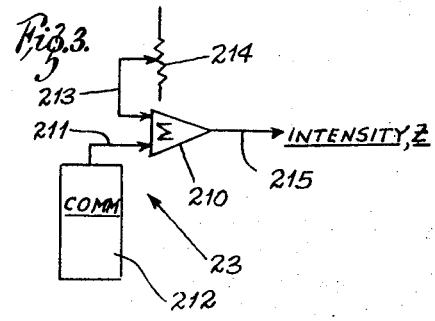
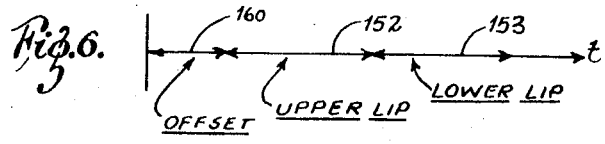
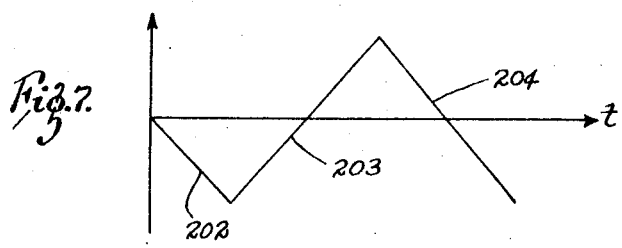
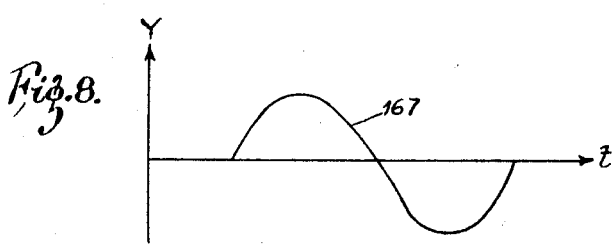
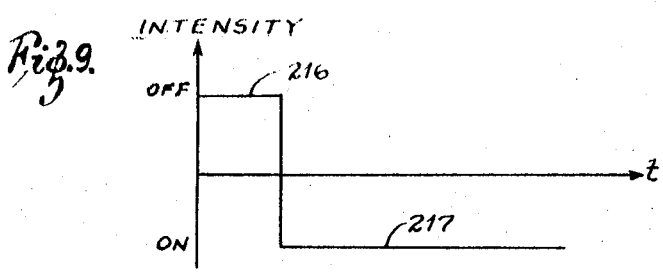

AUTOMATIC GENERATION OF A MOUTH DISPLAY AND ANIMATION OF THE MOUTH IN RESPONSE TO SOUND

BRIEF DESCRIPTION OF THE INVENTION

This automatic lip synchronization system has a lip synchronization control generator, an animation control network, and an intensity control network that cooperate to animate the motions of a mouth drawn on a display cathode ray tube in response to spoken or sung inputs to the system. The system isolates the different sounds that comprise human speech by categorizing their frequency content in a frequency spectrum analyzer. Thus, different sounds have different frequency content, and by filtering the frequencies of the input sounds, different and realistic effects on mouth movements can be achieved.

The automatic lip synchronization system can be used in conjunction with a computer for the automatic generation and display of animated images such as the one set forth in Lee Harrison, III's U.S. Pat. No. 3,364,382. Utilizing the various combinations of signals isolated by the frequency spectrum analyzer, control signals for animating the width of the mouth, the amplitude of the upper lip and the amplitude of the lower lip in response to human speech inputs are achieved. The result is that, as an image of lips is created on the face of a cathode ray tube by controlling the movement of the beam, the lips will be animated in synchronization with the input of spoken words.

BRIEF DESCRIPTION OF THE DRAWINGS

FIG. 1 is a schematic and block diagram of the lip synchronization control generator;

FIG. 2 is a schematic and block diagram of the animation control network;

FIG. 3 is a schematic and block diagram of the intensity control network;

FIG. 4 is a drawing of a basic mouth form;

FIG. 5 is a drawing of a mouth with lips as generated by the system of the invention;

FIG. 6 is a graph of the time sequence and duration of timing signals;

FIG. 7 is a graph of the mouth width control signals;

FIG. 8 is a graph of the gated oscillator output signal;

FIG. 9 is a graph of the intensity control signal.

DETAILED DESCRIPTION OF THE INVENTION:

The system for automatic lip synchronization consists of a lip synchronization control generator 21 shown in FIG. 1, an animation control network 22, and an intensity control network 23 illustrated in FIG. 3. In the lip synchronization control generator 21, signals are developed corresponding to changes in the width of the mouth, movement of the upper lip, and movement of the lower lip of a mouth supplying a voice input. These signals are fed to the animation control network 22 which, with other input signals to draw images of the lips that are to be animated, establishes signals for controlling the horizontal and vertical deflection amplifiers of a cathode ray tube on which the lips will be drawn and animated. The intensity control network modulates the intensity of the beam of the cathode ray tube.

Referring to the lip synchronization control generator 21 (FIG. 1) a pre-amplifier 30 has an input conductor 31 connected to a microphone input, tape input, or any other source of sound signals. The pre-amplifier 30 has a variable gain so that the amplitude of its output can be adjusted to the amplitude of the input signals.

Several conductors 32,33,34,35, and 36 are connected to the output 37 from the pre-amplifier 30 to transmit the pre-amplifier signals to individual AC filters 38,39,40,41, and 42, respectively. The number of AC filters used and their characteristics are selected according to the kind of animating control signals desired in relation to the input sounds. For the creation of control signals that will be used to animate a mouth and simulate realistic lip movement in relation to the sound input, five such AC filters 38-42 are used, each having a Q, or a ratio of band width to center frequency, of approximately 10. The center frequency of the AC filter 38 is about 5,600 hertz, of the AC filter 39 about 2,000 hertz, of the AC filter 40 about 1,500 hertz, of the AC filter 41 about 810 hertz, and the AC filter 42 about 530 hertz. The filters 38-42 produce output signals the amplitudes of which correspond to the amplitudes of the signals from the pre-amplifier 30 at the respective frequencies of the individual filters 38,39,40,41, and 42.

There are five detectors 46,47,48,49, and 50 corresponding to the five AC filters 38-42. The outputs from the AC filters 38-42 are delivered to the detectors 46-50 by conductors 51,52,53,54, and 55, respectively. The detectors 46-50 act as DC filters and rectifiers. Each detector rectifies and filters the output from the AC filter to which it is connected to extract the envelope of the positive cycles of the output signal from the AC filter. Each detector 46-50 has a rapid rise time and a longer fall time so that a control signal that will produce a natural mouth movement will result. The rise time of each detector is about 20 milliseconds and the fall time is about 120 milliseconds. The longer fall time prevents the mouth from closing too rapidly after a sound has been uttered.

The outputs from the detectors 46-50 are transmitted by output conductors 56,57,58,59, and 60, respectively, as individual inputs to summing amplifiers 61,62,63,64, and 65, respectively. The amplifier 61 has another input conductor 68 that transmits a variable DC voltage from a potentiometer 69. A conductor 70 transmits a variable DC voltage input to the amplifier 62 from a potentiometer 71. An input conductor 72 to the amplifier 63 transmits a variable DC voltage from a potentiometer 73. An input conductor 74 delivers a variable DC input to the summing amplifier 64 from a potentiometer 75. An input conductor 76 delivers a variable DC voltage to the summing amplifier 65 from a potentiometer 77. The potentiometers 69,71,73,75, and 77 are manually adjustable to set the steady state input conditions to the summing amplifiers 61-65 under conditions when there are no signals coming from the conductors 56,57,58,59, or 60.

There are three non-linear amplifiers, 80,81, and 82, for receiving various combinations of the signals from the summing amplifiers 61,62,63,64, and 65. The output from the summing amplifier 61 is transmitted through a conductor 83 to a potentiometer 84 for attenuating the output voltage. A conductor 85 delivers the attenuated signal as an input to the non-linear amplifier 82. The output from the summing amplifier 62 is transmitted by one conductor 86 to one potentiometer 87 and by another conductor 88 to another potentiometer 89. A conductor 90 transmits the attenuated signal from the potentiometer 87 to the non-linear amplifier 81. Another conductor 91 transmits the attenuated signal from the potentiometer 89 to the non-linear amplifier 82. The summing amplifier 63 has an output conductor 94 that delivers its signal to a potentiometer 95, and the attenuated signal from the potentiometer 95 is delivered by a conductor 96 as an input to the non-linear amplifier 81. Another conductor 97 is connected to the output of the summing amplifier 63 and to another potentiometer 98. The attenuated signal from the potentiometer 98 is delivered by a conductor 99 as an input to the non-linear amplifier 80. A third output conductor 100 transmits the signal from the summing amplifier 63 to a third potentiometer 101. A conductor 102 delivers the attenuated signal from the potentiometer 101 to the non-linear amplifier 82.

The output from the summing amplifier 64 is delivered by a conductor 105 to a potentiometer 106. The attenuated signal from the potentiometer 106 is transmitted through a conductor 107 as an input to the non-linear amplifier 80. A conductor 108 transmits the output from the summing amplifier 65 to a potentiometer 109. The attenuated signals from the potentiometer 109 is transmitted from a conductor 110 to a non-linear amplifier 81. Another conductor 111 delivers the output signal from the summing amplifier 65 to a potentiometer 112. The attenuated signal from the potentiometer 112 is transmitted through a conductor 113 to the non-linear amplifier 82. A third conductor 114 delivers the output signals from the summing amplifiers 65 to a potentiometer 115. The attenuated signal from the potentiometer 115 is transmitted by a conductor 116 to an inverter amplifier 117 which has another input conductor 118 carrying a DC bias voltage set by a manually adjustable potentiometer 119. The inverter amplifier 117 inverts its input, and the inverted signal is transmitted by a conductor 120 as an input to the non-linear amplifier 80.

The amplifiers 80, 81, and 82 are non-linear amplifiers so that the control signals ultimately produced will result in more realistic mouth movements because the magnitude of mouth movement is not directly proportional to the amplitude of the sound level emitted. The non-linear amplifiers 80, 81, and 82 are chosen so that all portions of the input signals below 1.3 volts are amplified by a factor of 3. The portions of the input signals the amplitudes of which are between 1.3 volts and 4.4 volts are attenuated to be 75 percent of the amount by which the signals exceed 1.3 volts. The portions of the input signals that exceed 4.4 volts are attenuated to be 8.8 percent of the amount by which they exceed 4.4 volts. Accordingly, in the non-linear amplifiers 80, 81, and 82, the low level signals are amplified and the higher level signals are attenuated.

The output from the non-linear amplifier 80 is transmitted by a conductor 124 to a potentiometer 125. The attenuated signal from the potentiometer 125 is transmitted by a conductor 126 as an input to a summing amplifier 127. Another input conductor 128 to the summing amplifier 127 is connected to a manually adjustable potentiometer 129. An output conductor 130 from the summing amplifier 127 carries the mouth width control signals.

A conductor 132 carries the output signals from the non-linear amplifier 81 to a potentiometer 133. The attenuated signals from the potentiometer 133 are transmitted by a conductor 134 as an input to a summing amplifier 135. Another input conductor 136 is connected to a manually variable potentiometer 137. An output conductor 138 from the summing amplifier 135 carries the upper lip control signals.

A conductor 140 is connected to the output of the non-linear amplifier 82 to deliver these output signals to a potentiometer 141. The attenuated signals are transmitted by a conductor 142 to a summing amplifier 143. Another input conductor 144 to the summing amplifier 143 is connected to a manually adjustable potentiometer 145. An output conductor 146 connected to the output of the summing amplifier 143 carries the lower lip control signals.

While the potentiometers 69, 71, 73, 75 and 77 set the steady state voltage levels for the individual frequency components that are used to make up the control voltages for the upper lip, the lower lip, and the mouth width controls, the potentiometers 129, 137, and 145 set the steady state amplitudes for these control signals.

These control signals are used in the animation control network 22 for the animation of a mouth. A typical mouth 150 is shown in FIG. 5. An outline 151 that controls the basic shape of the mouth is illustrated in FIG. 4 as consisting of an upper arch 152 and a lower arch 153 connected together at the ends 154 and 155. The mouth 150 consists of high frequency signals modulated and superimposed on the basic form lines 152 and 153 to provide the body 156 for the upper lip and the body 157 for the lower lip.

Three basic axial vectors are used to create the outline 151 for the mouth 150. FIG. 6 illustrates a time and sequence graph for the development of the three basic axial vectors. The first basic axial vector 160 is generated while the cathode ray tube is blank to establish an offset of the mouth from a reference point 161 (see FIG. 4) that may be fixed or moved under an independent control. Reference is made to the gross position network of U.S. Pat. No. 3,364,382, and the use of that gross position network to control the overall position of the mouth 150 independently or to control the gross position of the mouth 150 corresponding to the changes in gross position of a more complete figure of which the mouth 150 is a part. The duration of generation of the offset basic axial vector 160 establishes the nominal width of the mouth 150.

The next basic axial vector generated is the one corresponding to the upper lip 152. Its duration is exactly twice the duration of the offset basic axial vector 160. The third basic axial vector generated is the one corresponding to the lower lip 153. Its duration is also exactly twice that of the generation of the offset basic axial vector 160 and, therefore, is equal to the duration of the generation of the basic axial vector 152 corresponding to the upper lip.

Referring to FIG. 2, the animation control network 22 has a gated oscillator 165. A conductor 166 delivers a control signal to the gated oscillator 165. The signal carried by the conductor 166 is a constantly repetitive cycle of the generation of signals corresponding to the basic axial vectors for the durations and in the sequence illustrated in FIG. 6, beginning with the duration of the basic axial vector 160 followed by the vectors 152 and 153. While the offset basic axial vector 160 is being generated, the gated oscillator 165 has a zero signal output. However, for the duration of the upper lips basic axial vector 152, the gated oscillator 165 produces an output that is a positive half cycle of a sine wave and for the duration of the lower lip basic axial vector 153, the gated oscillator 165 produces an output signal that is the negative half cycle of the sine wave. Therefore, the output from the gated oscillator is a repeating zero signal followed by a positive half cycle of a sine wave and then a negative half cycle of a sine wave. This signal 167 generated by the gated oscillator is shown in FIG. 8.

The output signal 167 from the gated oscillator 165 is transmitted by a conductor 168 to a multiplier 169. Another input conductor 170 to the multiplier 169 leads from the output of a commutator 171. The conductor 138 carrying upper lip control signals and conductor 146 carrying lower lip control signals both from the lip synchronization control generator 21, are inputs to the commutator 171. The commutator 171 transmits the upper lip control voltage to its output while the positive half cycle of the sine wave corresponding to the upper lip is being transmitted to the multiplier 169. While the negative half cycle of the sine wave from the gated oscillator is being transmitted to the multiplier 169, the commutator 171 transmits the lower lip control voltage through the output 170 to the multiplier 169. The output from the multiplier 169, therefore, is first a zero signal and then it is the signal corresponding to the second axial vector 152 as modulated by the upper lip control voltage transmitted from the conductor 138. Third, it is the basic axial vector 153 corresponding to the lower lip as modulated by the voltage coming from the lower lip control conductor 146. This output from the multiplier 169 is transmitted by a conductor 172 to a summing amplifier 173.

The output from the gated oscillator 165 is also transmitted by a conductor 176 to a potentiometer 177. The potentiometer 177 is manually adjustable to attenuate the amplitude of the output from the gated oscillator 165. This attenuated signal is transmitted by a conductor 178 to an amplifier 179. The output from the amplifier 179 is transmitted by a conductor 180 to a multiplier 181 and by a conductor 182 to a multiplier 183. Another input conductor 184 to the multiplier 181 carries a high frequency sine wave. An input conductor 185 to the multiplier 183 carries a high frequency cosine wave. These sine and cosine waves carried by the conductors 184 and 185 may be generated by any suitable means, such as by the clock 10 of the system of U.S. Pat. No. 3,364,382.

The output from the multiplier 181 is the high frequency sine wave input from the conductor 184 which is amplitude modulated by the attenuated sine wave from the conductor 180. This output is transmitted by a conductor 186 to a summing amplifier 187.

The output from the multiplier 183 is a high frequency cosine wave supplied by the conductor 185, modulated by the attenuated sine wave supplied by the conductor 182. This output from the multiplier 183 is transmitted by a conductor 188 to the summing amplifier 173.

The modulation of the high frequency sine and cosine waves by the attenuated sine wave from the gated oscillator is for shaping the lips. The general shape of lips shown in FIG. 5 may be adequate for caricatures. It will be apparent, however, that for other lip shaping, waveforms other than a sine wave could be generated and used to modulate the high frequency sine and cosine waves.

A conductor 190 is connected to a potentiometer 191 as an input to the summing amplifier 187. The potentiometer 191 is manually adjustable to provide a basic position voltage for the mouth in the horizontal direction. A conductor 192 is connected to a potentiometer 193 as an input to the summing amplifier 173. The potentiometer 193 is manually adjustable to provide a basic position voltage in the vertical direction.

The mouth width control signal carried by the conductor 130 and generated by the lip synchronization control generator 21 is transmitted to a multiplier 195. Another input conductor 196 to the multiplier 195 leads from a commutator 197. The commutator is timed to generate no signal at its output when the gated oscillator is transmitting no signal, to generate a steady positive DC voltage at its output while the gated oscillator is generating the positive half cycle of a sine wave, and to generate a steady negative voltage equal in amplitude to the positive voltage while the gated oscillator 165 is generating the negative half cycle of the sine wave. These commutator signals are modulated in the multiplier 195 by the amplitude of the mouth width control voltage carried by the conductor 130.

The output from the multiplier 195 is transmitted by a conductor 198 to an integrator 199. The output from the integrator 199 is a series of ramps with opposite slopes, shown in FIG. 7, on an X v. time graph with the X coordinate corresponding to the width of the mouth in the horizontal, or X, direction. The integrator output includes a negative-going leg 202 corresponding to the generation of the placement axial vector 160 in a −X direction followed by a positive-going section 203 corresponding to the generation of the positive half cycle and then a negative-going section 204 corresponding to the negative half cycle of the sine wave from the gated oscillator 165. A conductor 205 transmits this ramp signal to the summing amplifier 187.

The output from the summing amplifier 187 is delivered by a conductor 207 to the horizontal position control of the beam of the cathode ray tube, such as the horizontal deflection plates. The signal carried by the conductor 207 corresponds to the horizontal component of the body of the lips as animated by voice modulation. A conductor 208 from the output of the summing amplifier 173 transmits its signals to the vertical position control of the beam, such as the vertical deflection plates. The signal carried by the conductor 208 corresponds to the vertical component of the body of the lips as animated by voice modulation.

In the intensity control network 23 of FIG. 3, a summing amplifier 210 has one input conductor 211 leading from a commutator 212. Another input conductor 213 leads from a manually adjustable potentiometer 214. The output conductor 215 from the summing amplifier 210 is connected to the intensity control grid of the beam of the cathode ray tube.

The potentiometer 214 is set to establish the normal intensity of the beam in its "on" or drawing condition. The commutator 212 delivers an output signal 211 that will combine with the signal from the potentiometer 214 to blank the beam during drawing of the offset basic axial vector 160 and to turn the beam on with a uniform intensity during drawing of the upper and lower lips. The output signals from the amplifier 210 are illustrated in FIG. 9 with the blanking signal section 216 blanking the beam and the unblanking signal section 217 turning the beam on.

OPERATION

As human speech or singing is entered from the microphone or tape input conductor 31, the sounds are amplified by the variable gain pre-amplifier 30, the gain of which is set manually according to the sound level of the input. These different sounds are then categorized by the AC filters 38–42 according to their frequency content. The AC filters 38–42 thus function as frequency spectrum analyzers that constantly identify the characteristics of the incoming sounds by filtering the frequencies.

The frequency-isolated signals are rectified and filtered by the detectors 46–50 to extract the envelopes of the positive cycles of the inputs, utilizing fast rise times and slow fall times to simulate more natural mouth movement and prevent the mouth from closing too rapidly after speaking. The signals are then fed to the summing amplifiers 61–65 where they are combined with individual offset DC voltages set manually at the potentiometers 69–77. The outputs from the summing amplifiers 61–65 are selectively attenuated by the manually adjustable potentiometers 84,87,89,98,101,95,106,109,112 and 115 to proportion the influence of the different signals before selectively combining them to control movements of the upper lip, lower lip, and width of the mouth.

The non-linear amplifier 80 that feeds the summing amplifier 127 for controlling mouth width receives and combines signals that are passed by the 810 hertz filter 41, the 1,500 hertz filter 40, and the 530 hertz filter 42 (the latter after inversion in the inverter amplifier 117). Thus, it is sounds in the lower frequency ranges that have a primary effect on the width of the mouth during speaking, such as in uttering "o" and "u" sounds. The signals from the 530 hertz filter 42 are inverted in the inverter amplifier 117 so that they will have the opposite effect on the mouth width control as they have on the upper and lower lip controls. Thus, while signals in the extremely low frequencies may produce control signals for moving the upper and lower lips apart, the inverted signal will produce concurrent narrowing of the mouth. The effect on the mouth is realistically characteristic of some sounds such as "o" sounds.

The non-linear amplifier 81, which delivers signals to the upper lip control summing amplifier 135, receives a combination of input signals passed by the 3,000 hertz filter 39, the 1,500 hertz filter 40, and the 530 hertz filter 42. Therefore, it is signals within these frequency ranges proportioned by the attenuation of the potentiometers 87,95, and 109, that are to control animation of the upper lip.

The non-linear amplifier 82 that supplies signals to the lower lip control summing amplifier 143 receives input signals passed by the 5,600 hertz filter 38, the 3,000 hertz filter 39, the 1,500 hertz filter 40, and the 530 hertz filter 42. Therefore, it is these frequencies that have been determined as having the most realistic influence on movements of the lower lip.

The attenuating potentiometers 84,87,89,95,98,101,106,109,112, and 115 are normally set for the most realistic movement in the same way that the selected combination of frequency inputs to the non-linear amplifiers 80,81 and 82 are normally selected for the most realistic mouth movements. However, these attenuating potentiometers may be adjusted for other desired animating effects.

The non-linear amplifiers 80,81, and 82 apply different amplification factors to the different amplitudes of input signals. This causes the amplitudes of the output signals from the amplifiers 80,81, and 82 to correspond more realistically to the varying amplitudes of the combined input signals, again for more realistic mouth animation.

Finally, the outputs from the summing amplifiers 127,135, and 143, representing the combined input signals from the non-linear amplifiers 80,81, and 82 and the potentiometers 129,137, and 145 constitute the mouth width control signal, the upper lip control signal, and the lower lip signal, respectively. Accordingly, when the mouth is at rest because there is no incoming sound, the position of the mouth is established by the DC voltage levels derived from the potentiometers 129,137, and 145.

The mouth width control signals are fed to the multiplier 195 of the animation control network. The upper lip control signals and lower lip control signals are fed to the commutator 171. At the same time, repetitive control signals having time durations represented by the illustration of FIG. 6 are fed to the gated oscillator 165 so that the output from the gated oscillator will be a zero signal for the duration of the placement axial vector 160, the positive cycle of a sine wave for the duration of the upper lip basic axial vector 152 and the negative half cycle of the sine wave for the duration of the lower lip basic axial vector 153. This signal oscillator output 167 is illustrated in FIG. 8. The output from the gated oscillator 165 is fed to the multiplier 169 while the output from the commutator 171 is also fed to the multiplier 169. The output from the commutator 171 consists of the control voltages that establish the amplitude of the arch of the upper lip while the upper lip is being drawn and the amplitude of the arch of the lower lip while the lower lip is being drawn. The output from the multiplier 169 constitutes one input to the vertical deflection control summing amplifier 173.

The multiplier 195 receives the mouth width control signals and the signals from the commutator 197. The commutator generates voltages at its output that are equal but opposite during the drawing of the upper and lower lips. The combined signals from the multiplier 195 are integrated in the integrator 199 to produce a ramp signal as illustrated in FIG. 7, and this ramp signal is fed as an input to the horizontal deflection control summing amplifier 187.

The horizontal deflection control summing amplifier 187 has a position control voltage provided by the potentiometer 191. Likewise, the vertical deflection control summing amplifier 173 has a position control voltage established by the potentiometer 193.

The third input to the summing amplifier 187 is the high frequency sine wave modulated by the output from the gated oscillator 165, and attenuated by the potentiometer 177. The third input to the vertical deflection control amplifier 173 is the high frequency cosine wave modulated by the sine wave output of the gated oscillator 165, and attenuated by the potentiometer 177. The overall effect of the high frequency sine and cosine waves when they are of the same frequency, is to cause small, closely overlapping circles to be drawn along the basic form lines 152 and 153 of the lips to give the lips body as illustrated in FIG. 5.

The intensity of the display beam is modulated by the intensity control network 23 to turn the beam off during the drawing of the placement axial vector 160 and on at uniform intensity during the drawing of the mouth 150.

This invention has been described as a system for animating a mouth, the image of which is generated by a computer, using waveforms to animate the mouth. The system can also be used in other ways to animate a mouth. For example, if a mouth is drawn on a cathode ray tube using a sweeping raster with intensity control for drawing the mouth animation might be done directly on the raster. Thus, using a system such as disclosed in Lee Harrison, III's, et al. application Ser. No. 882,125, filed Dec. 4, 1969, the raster can be separated into sections, one of which includes the upper lip and the other of which includes the lower lip. Then the output signals from the mouth width control summing amplifier 127, the upper lip control summing amplifier 138, and the lower lip control summing amplifier 146 can be applied for the animation of such raster sections.

Various changes and modifications may be made within this invention as will be readily apparent to those skilled in the art. Such changes and modifications are within the scope and teaching of this invention as defined by the claims appended hereto.

What is claimed is:

1. A system for automatic generation and animation of a mouth display comprising means for generating a mouth display on a cathode ray tube, the mouth having an upper lip and a lower lip, means to receive sound input signals, means to isolate the sound input signals according to different frequency ranges characteristic of the sound signals, means to extract the rectified envelope of each isolated frequency range, means to combine the different isolated signals in predetermined combinations, means to produce a mouth width control signal influenced by a first of said predetermined combinations of signals, means to produce an upper lip control signal influenced by a second of said predetermined combinations of signals, means to produce a lower lip control signal influenced by a third of said predetermined combinations of signals, and means to animate the width, upper lip and lower lip of the mouth in response to the mouth width, upper lip, and lower lip control signals, respectively.

2. The system of claim 1 wherein said mouth display generating means includes means for generating signals for controlling the deflection of the beam of the display tube to draw a representation of a mouth.

3. The system of claim 2 including means for controlling the intensity of the beam.

4. The system of claim 1 including means for displaying

5. The system of claim 4 wherein the upper lip is displayed on one raster, and the lower lip on another raster.

6. A system for generating a display of a mouth and for animating movements of the mouth in response to voice articulations comprising means for generating deflection signals defining separate rasters on a cathode ray tube display device, means for generating modulated control signals, means for combining the modulated control signals with the deflection signals, means for applying the combinations of deflection and modulated control signals to the deflection inputs of the display device for generation of the rasters, means for displaying the upper and lower lips of the mouth on the separate rasters, and means for modulating the control signals in response to the voice modulations to animate movements of the lips according to said voice modulations.

7. A system for generating a display of a mouth on a cathode ray tube display device and for animating movements of the mouth in response to voice articulations comprising means for generating waveforms defining the basic form of the mouth, means responsive to a first section of one of the waveforms for defining the basic form of the upper lip, means responsive to a second section of said one of the waveforms for defining the basic form of the lower lip, means for generating modulated control signals, means for combining the modulated control signals with the first and second waveform section signals, means for applying the combinations of control and waveform section signals to the deflection inputs of the display device, and means for modulating the control signals in response to voice modulations to animate movements of the lips according to said voice modulations.

8. The system of claim 7 wherein the waveform comprises a sine wave, the first section being defined by the positive half cycle of the sine wave and the second section being defined by the negative half cycle of the sine wave.

9. The system of claim 7 including means to generate high frequency signals, and means for combining the high frequency signals with the wave form signals for defining body for the lips.

10. The system of claim 7 wherein one set of control signals controls movements of the upper lip, another set of control signals controls movements of the lower lip, and still another set of control signals controls the width of the mouth.

11. The system of claim 7 including means to control the intensity of the mouth.

12. A method of generating and animating a mouth display comprising the steps of feeding voice signals into a frequency spectrum analyzer, identifying and isolating in the frequency spectrum analyzer different parts of the voice signals according to different frequency ranges, generating a mouth display on a cathode ray tube display device, the mouth having upper and lower lips, and controlling movements of the lips of the mouth as functions of the different parts of the voice input signals.

13. The method of claim 12 including the steps of selectively attenuating the effects of the different parts of input signals, combining predetermined ones of the different parts of input signals to produce control signals, and utilizing the control signals for controlling movements of the lips.

14. The method of claim 13 including the step of modifying the amplitudes of the control signals in non-linear relationship to the amplitudes of the input signals.

15. The method of claim 13 including the step of setting independent bias signals to position the lips in the absence of input voice signals.

16. The method of claim 13 including the step of utilizing a selected first one of the control signals for controlling movements of the upper lip, utilizing a selected second one of the control signals for controlling movements of the lower lip, and utilizing a selected third one of the control signals for controlling the width of the mouth.

17. A system for generating a display of a mouth and for animating movements of the mouth in response to sound input signals comprising means for generating a mouth display on a cathode ray tube display device, the mouth having an upper lip and a lower lip, means for isolating the sound input signals according to different frequency ranges characteristic of the sound input signals, means for generating control signals from the isolated sound input signals, and means for animating movements of the mouth as displayed on the display device in response to the control signals.

* * * * *